United States Patent
Colombo et al.

(10) Patent No.: US 8,919,009 B2
(45) Date of Patent: Dec. 30, 2014

(54) METHOD FOR CONTROLLING A CLOTHES DRYER AND CLOTHES DRYER USING SUCH METHOD

(75) Inventors: Davide Colombo, Gerenzano (IT); Daniele Martinello, Besozzo (IT); Matteo Santinato, Albignasego (IT); Fabrizio Padula, Brescia (IT); Antonio Visioli, Brescia (IT)

(73) Assignee: Whirlpool Corporation, Benton Harbor, MI (US)

( * ) Notice: Subject to any disclaimer, the term of this patent is extended or adjusted under 35 U.S.C. 154(b) by 199 days.

(21) Appl. No.: 13/550,741

(22) Filed: Jul. 17, 2012

(65) Prior Publication Data

US 2013/0019495 A1    Jan. 24, 2013

(30) Foreign Application Priority Data

Jul. 21, 2011  (EP) ..................................... 11174919

(51) Int. Cl.
*D06F 58/28*    (2006.01)
*D06F 58/20*    (2006.01)

(52) U.S. Cl.
CPC .............. *D06F 58/28* (2013.01); *D06F 58/203* (2013.01)
USPC .............................................. 34/413; 34/606

(58) Field of Classification Search
CPC .............. F26B 5/00; F26B 7/00; D06F 58/00; D06F 58/028; D06F 59/00; D06F 59/08; D06F 60/00
USPC .......................... 34/413, 606, 610; 68/19, 20
See application file for complete search history.

(56) References Cited

U.S. PATENT DOCUMENTS

| | | | |
|---|---|---|---|
| 3,702,030 A * | 11/1972 | Janke | 34/498 |
| 4,125,946 A * | 11/1978 | Prager | 34/80 |
| 4,231,166 A * | 11/1980 | McMillan | 34/553 |
| 4,689,896 A * | 9/1987 | Narang | 34/82 |
| 4,891,892 A | 1/1990 | Narang | |
| 6,745,495 B1 * | 6/2004 | Riddle et al. | 34/497 |
| 7,017,280 B2 * | 3/2006 | Green et al. | 34/486 |
| 7,525,262 B2 | 4/2009 | Carow | |
| 8,156,660 B2 * | 4/2012 | Carow | 34/485 |
| 2004/0261286 A1 | 12/2004 | Green et al. | |
| 2006/0152178 A1 * | 7/2006 | Carow | 318/66 |
| 2007/0151311 A1 | 7/2007 | McAllister et al. | |
| 2007/0251118 A1 | 11/2007 | Doh | |
| 2011/0030428 A1 | 2/2011 | Han et al. | |

FOREIGN PATENT DOCUMENTS

EP    1688532 A2 *   8/2006

OTHER PUBLICATIONS

European Search Report for Corresponding EP 11174919.8, Jan. 20, 2012.

* cited by examiner

*Primary Examiner* — Steve M Gravini

(57) ABSTRACT

A method for controlling the operation of a clothes dryer having a drying chamber and an air flow system including a variable speed blower for forcing air through the drying chamber comprises the step of assessing a value related to the water removal rate and the step of adjusting the speed of the blower depending on the assessed value, the value being preferably based on a ratio between the water condensing rate and the power of a heater used to heat up the air flow upstream the drying chamber.

16 Claims, 6 Drawing Sheets

METHOD FOR CONTROLLING A CLOTHES DRYER AND CLOTHES DRYER USING SUCH METHOD

BACKGROUND OF THE INVENTION

1. Field of the Invention

The present invention relates to a method for controlling the operation of a clothes dryer comprising a drying chamber and an air flow system including a variable speed blower for forcing air through the drying chamber. The inventions relates to a household clothes dryer as well.

2. Description of the Related Art

Dryers having a variable speed blower are known in the art. U.S. Pat No. 2004/0261286 discloses a method for controlling the operation of a air vented dryer in which the speed of the blower is controlled based on the received temperature sensor signals in order to maintain the drying chamber inlet and outlet temperatures below predetermined maximum temperature. In other words the speed control of the blower is following the same approach of a heater control. Moreover in such document it is disclosed that the heater and the blower are never adjusted at the same time.

U.S. Pat No. 2007/0251118 discloses a method for controlling a dryer in which the speed of the blower can be changed between two set levels according to a sensing signal from an electrode sensor.

The above known methods do not allow increasing substantially the efficiency of the drying operation. As for U.S. Pat No. 2007/025118 it is necessary to use a specific load sensor which increases the overall cost of the appliance.

SUMMARY OF THE INVENTION

The object of the present invention is a control method that aims at increasing the efficiency of a tumble dryer reducing the energy and time consumption. A further object is to maximize the energy saving advantage deriving from the use of a variable speed blower.

Such objects are reached thanks to the features listed in the appended claims.

According to the invention, the preferred control scheme employs a heater to control the temperature of the air flow and an electric motor to control the speed of the air flow. In the method according to the invention, a value related to the water removal rate is assessed and the speed of the blower is adjusted according to such assessed value.

With the term "water removal rate" we mean the rate of water evaporation from clothes in the drying chamber. A value related to this water removal rate can be assessed in different ways, depending on the kind of dryer (air vented, condensing dryer, and heat pump dryer). One way, particularly for air vented dryers, is to assess the change of weight of the overall appliance vs. time, to use external sensors (for instance humidity sensors) or to assess, at predetermined time intervals, the load in the drying chamber by using well known techniques for assessing load of clothes in washing machines or dryers (one of such well known techniques being based on the evaluation of the inertia of the load). Another way, particularly for condensing dryer, is to assess the water condensing rate by measuring the amount of water stored in a condensing water tank. A preferred way for assessing the above value related to the water removal rate in a condensing dryer is to measure the output temperature of the cooling air in the heat exchanger (condenser), such value (or better the difference between the ambient air temperature and said output temperature) being linked to the variation of enthalpy in the process air (i.e. the air flowing in the inner loop of the dryer) across the heat exchanger, and therefore of the condensing rate (the ratio between the air flow in the inner loop and the cooling air flow being known).

According to a preferred embodiment of the invention, the above value related to the water removal rate is also related to the power delivered by the heater of the dryer, such value being preferably a ratio between the water condensing rate and the power applied to the heater or heaters. According to a further feature of the invention, the control method is aimed at maximizing the above ratio (defined as a "performance index") by adjusting the blower speed accordingly. If the assessed ratio at a certain time is higher than the ratio assessed at a previous time, then the blower speed is increased; if such ratio is lower than the one at a previous time, then the blower speed is decreased. This is therefore an adaptive method used advantageously for determining the speed of the blower or fan.

BRIEF DESCRIPTION OF THE DRAWINGS

Further advantages and features of a method and a dryer according to the present invention will be clear from the following detailed description provided as a not limiting example, with reference to the annexed drawings in which.

DETAILED DESCRIPTION OF THE PREFERRED EMBODIMENTS

Figure 1:
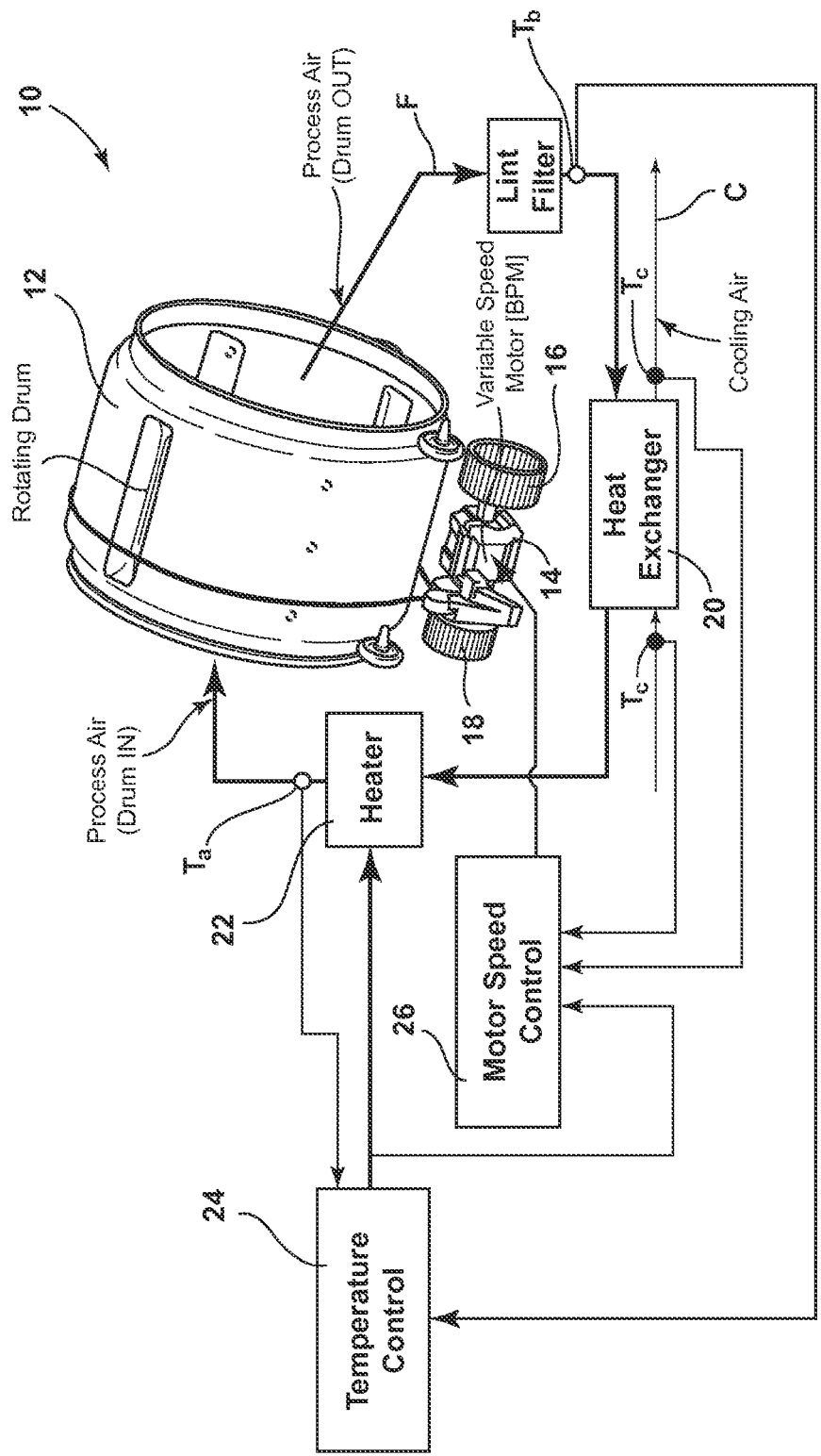
FIG. 1 is a schematic layout of a tumble condensing dryer according to the invention.

With reference to FIG. 1, a tumble dryer 10 comprises a rotating drum 12 actuated by an electric motor 14 and adapted to contain a certain amount of clothes, a process fan 16 that drives air flow F and a cooling fan 18 which drives a cooling air flow C along the outer side of a heat exchanger (condenser) 20.

In the example shown in FIG. 1 the drum 12, the process fan 16 and the cooling fan 18 are driven by the same motor 14, but it is clear that they can be driven by using three different motors or two combined motors (for instance one for the drum and the other for the two fans).

A heater 22 (having one or more heating elements) is used to heat the process air upstream the drum 12 according to a predefined number of power levels.

The dryer comprises a temperature sensor Ta that measures the temperature of the air after the heater 22 and before entering the drum 12, a temperature sensor Tb measuring the temperature of the clothes and a temperature sensor Tc that measures the output temperature of the cooling air flowing outside of the heat exchanger 20.

A common practice is to control only the temperature of the tumble dryer by feeding back the drum output temperature in the feedback control system. The drum output temperature (measured by temperature sensor Tb) is usually a good approximation of the clothes temperature and it therefore kept under control to avoid damages to the fabrics. The feedback is usually made through hysteresis control i.e. the heater 22 is switched on when the feedback temperature is below a predefined threshold and switched on when it is above a second predefined threshold. In this way the hysteresis control shows low performance when the temperature of the heater 22 is around the upper limit and it can cause oscillation of the clothes temperature.

A more advanced way to control the heater 22 is through a PI (proportional-integral) control and PWM (Pulse Width Modulation).

With particular reference to the method according to the present invention, the efficiency of the tumble dryer 10 is increased by controlling both the temperature of the clothes and the airflow in the drum 12. The temperature is controlled by changing the power delivered by the heater 22 while the airflow F is controlled by changing the speed of the fan 16 by means of the variable speed electric motor 14.

The temperature control is preferably carried out by means of a closed loop like PID controller which exploits the signals from the temperature sensors Ta and Tb of the heater 22 and of the clothes respectively, while an adaptive strategy is employed to set the speed of the fan 16 in order to maximize the ratio between the water condensing rate and the power applied to the heating elements of the heater 22.

This control strategy requires the computation of the condensing rate or the assessment of a value related to the condensing rate, called also water removal rate. With the term "value related to" we mean any value which can be assessed through a direct measure or computated by means of a process software residing in a control process unit of the appliance which comprises a temperature control unit 24 and a motor speed control 26. This value can be estimated in several ways by using temperature or external sensors like humidity sensors.

An efficient and preferred configuration of temperature sensors and method to estimate the condensing rate is explained in the following example with reference to FIG. 1.

Actually, the control of the air flow is a key issue for the efficiency of the overall drying process, by taking into account that the flow F of the air into the drum (internal loop) is related to the flow of the cooling air C (external loop). In fact, at the beginning of the drying operation it is advisable to decrease the air flow in order to increase the fabric temperature as fast as possible so that the evaporation can start soon. Subsequently, decreasing the speed of the fan 16 or keeping it at a low level would cause an increment of the relative humidity of the air upstream the heat exchanger 20 but, at the same time, a decrement of the efficiency of the heat exchanger 20 mainly due to the lower heat exchange coefficient.

Conversely, increasing the speed of the fan 16 is beneficial for the heat exchanger efficiency but the relative humidity of the air F entering in the heat exchanger 20 is reduced.

Further, a too high rotation speed of the drum 12 (in the case the same motor 14 is used for the fan 16 and for the drum 12) could make the clothes roll up into a ball and this has to be clearly avoided.

An adaptive strategy is therefore adopted to provide an effective solution. The initial fan speed is determined depending on the estimated load. We do not go onto detail of load estimation since this is an already known technique (one method is disclosed for instance in the already mentioned U.S. Pat. No. 2007/0251118).

Then, a "performance index" $\phi$ is defined as the average ratio between the water condensing rate and the power applied to the heating elements of the heater 22, and a time period is defined in such a way that a rotation speed is applied for a fixed number of controlling PWM cycles and the performance index is subsequently evaluated for a predefined time control period.

Each time, the rotation speed is modified (increased or decreased) in the same way of the previous time when the previous modification has yielded an increment of the value of the performance index in the previous control period. Otherwise (namely, if the previous modification has yielded a decrement of the value of the performance index), the modification is done in the opposite direction with respect to the previous one. The control period is preferably of the order of 1 sec to allow continuous monitoring of the performance.

Figure 2:
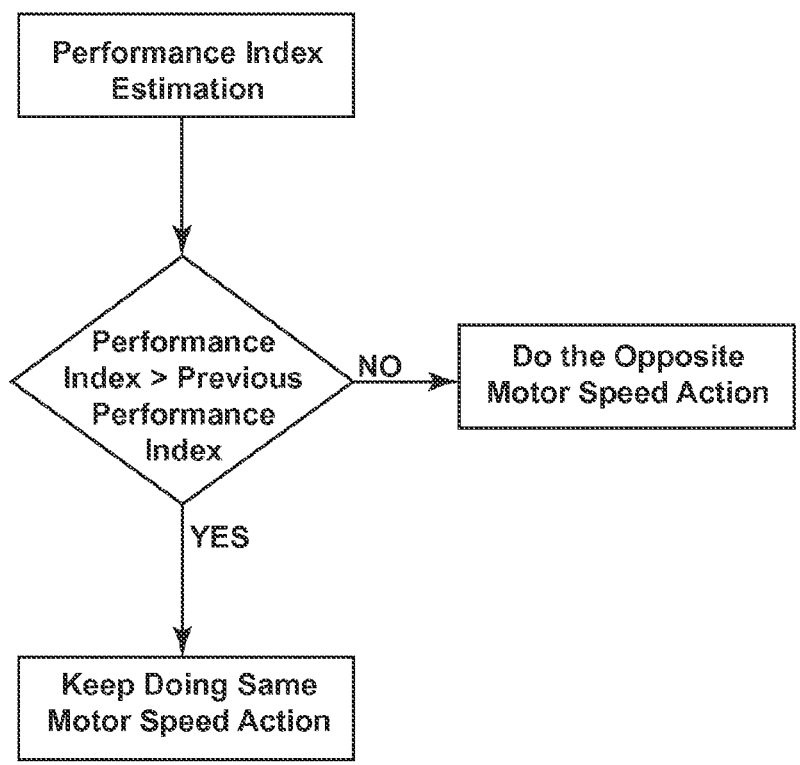
FIG. 2 is a block diagram showing how the blower speed is adjusted according to the invention.
Figure 3:
FIG. 3 is a diagram showing how the blower speed is adjusted by using the controlling scheme of FIG. 2.

This methodology is shown in FIG. 2.

The estimation of the value of the condensing rate can be done by taking into account that, since the relative humidity of the air in the drum 12 is high, the difference of the temperature of the air flow F in the internal loop at the input of the heat exchanger 20 and that at the output is small (the water condensation being carried out at a constant temperature), while this difference is high for the cooling air C (external loop). Thus, by measuring the temperature at the output of the heat exchanger 20 (in the external loop) by means of the temperature sensor Tc, the difference of the cooling air temperature between the input and the output of the heat exchanger 20 can be measured (the temperature at the input is the room temperature which can be simply measured once by the same sensor Tc at the beginning of the drying process, or it can be measured by a specific temperature sensor Ti). By means of this measure the enthalpy difference between the air flowing inside and outside the heat exchanger 20 can be estimated. Thus, by knowing the ratio between the air flows F and C of the internal and external loops (which in the example shown in FIG. 1 depends on the shape of the fans 16 and 18) and by applying the principle of conservation of energy, the variation of enthalpy in the internal loop can be estimated. Indeed this variation depends only on the water condensing rate because, as mentioned before, the difference of the temperature is small and therefore negligible. As a consequence, this strategy could be easily used for adjusting the drum speed during the drying cycle.

To improve dryer efficiency is required to maximize the parameter $\phi$:

$$\phi = (dm/dt)/P_{heater} \sim = P_{water\ removed}/P_{heater}$$

where $P_{water\ removed}$ is the product of enthalpy of condensed water for its mass change rate.

The control algorithm estimates the performance indicator $\phi$ in real-time, while the appliance is performing a drying cycle.

On the basis of trend of $\phi$ and in order to maximize the appliance efficiency the control can tune the fan speed and heaters duty cycle of the dryer.

The output of $\phi$ control is also compensated according to the dryer phase (start, warm-up, drying, cooling down) to be sure to perform the best cycle optimization.

For example, during a warm-up phase it is advisable to minimize as possible the time required to reach the regular working temperature of the appliance. The method according to the invention reduces automatically the fan speed during this phase and minimizes the temperature drop across the condenser 20 (reducing heat lost in the ambient).

Figure 4:
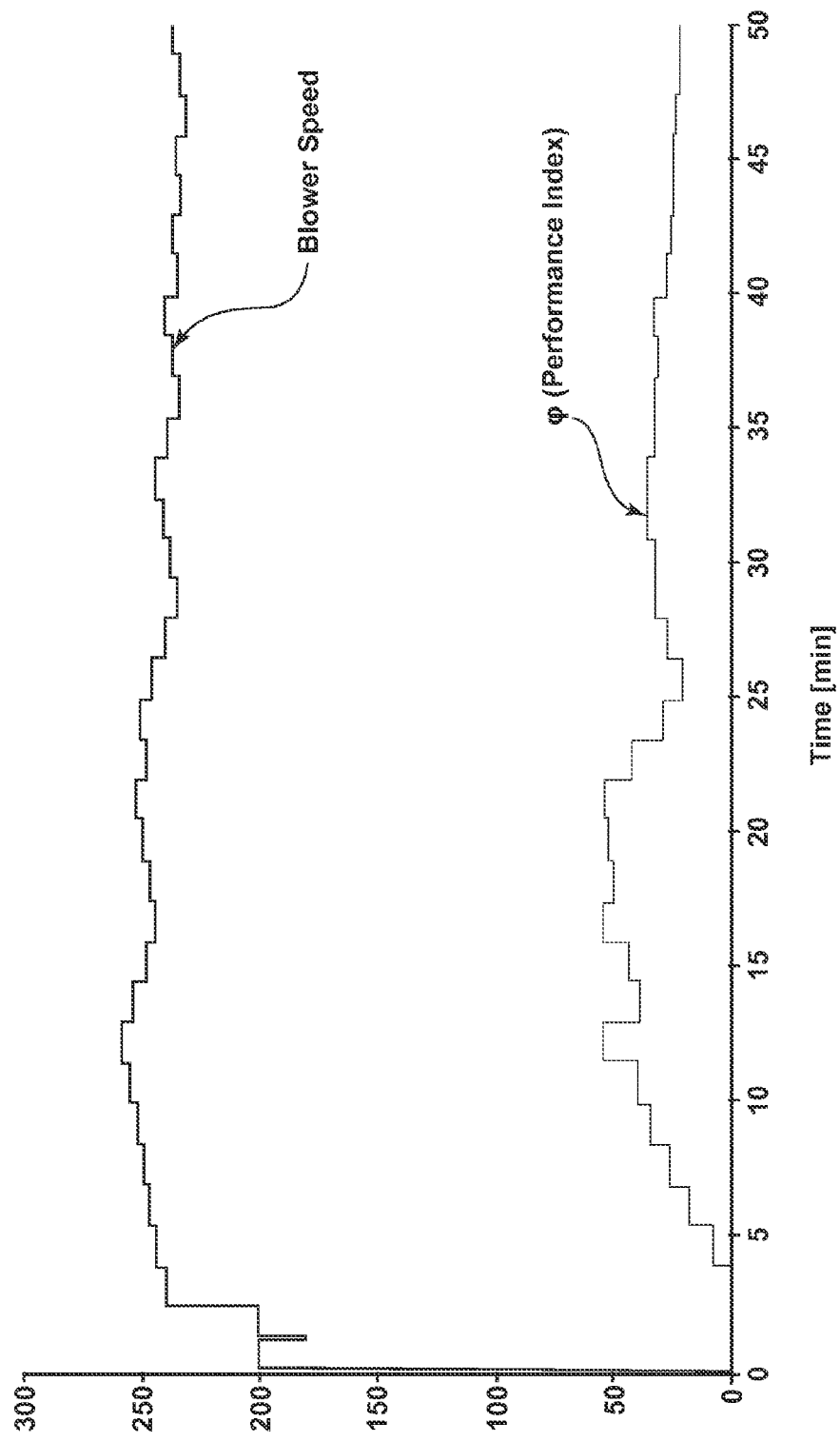
FIG. 4 is an experimental diagram similar to FIG. 3.

The graph of FIG. 4 shows the output of a control method according to the invention where a continuous tuning of the fan speed of dryer (upper line) is carried out by assessing the performance index $\phi$ (lower line) during a drying cycle.

Figure 5:
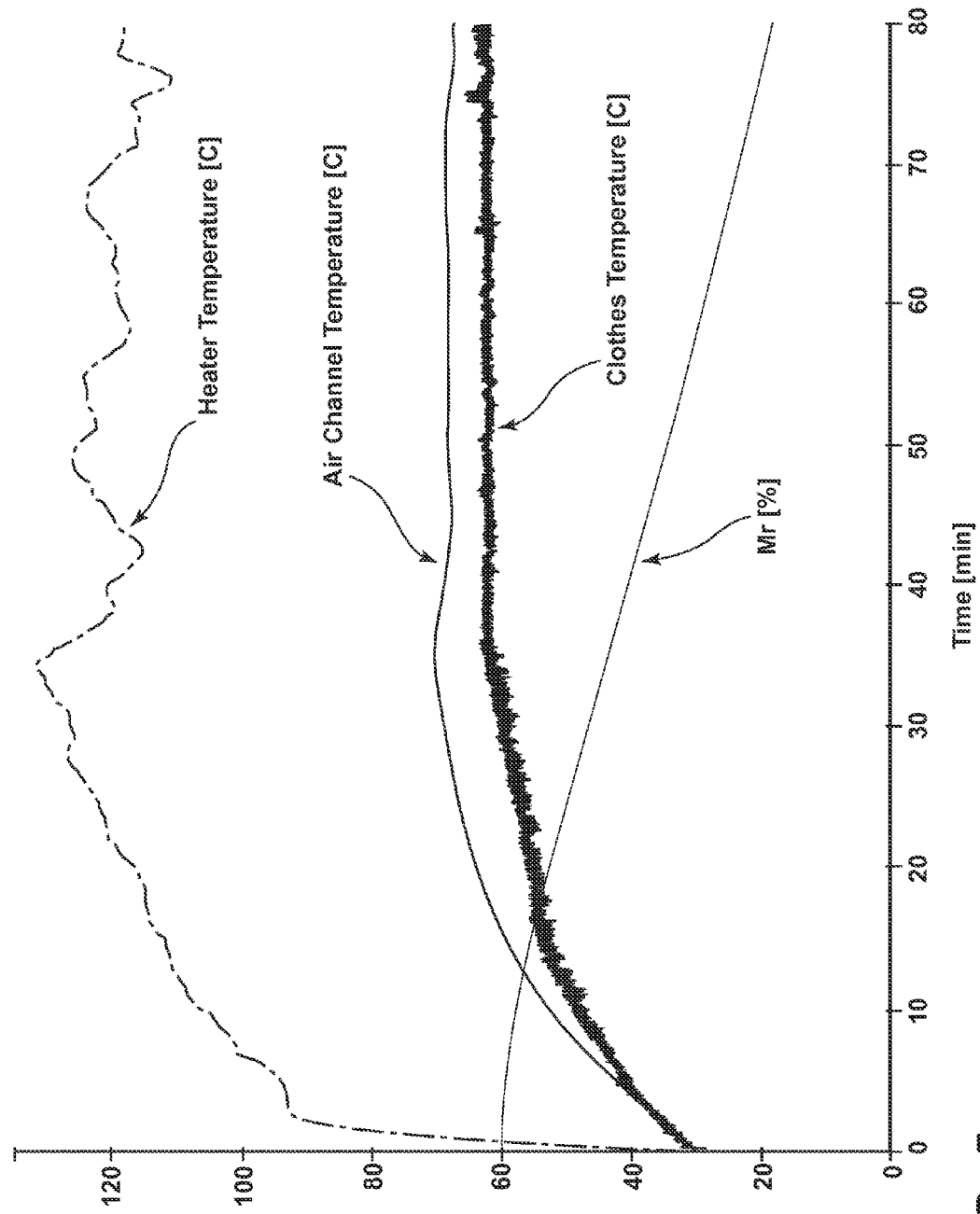
FIGS. 5-6 are diagrams showing how the air temperatures and blower speed change by using the method according to the present invention.
Figure 6:
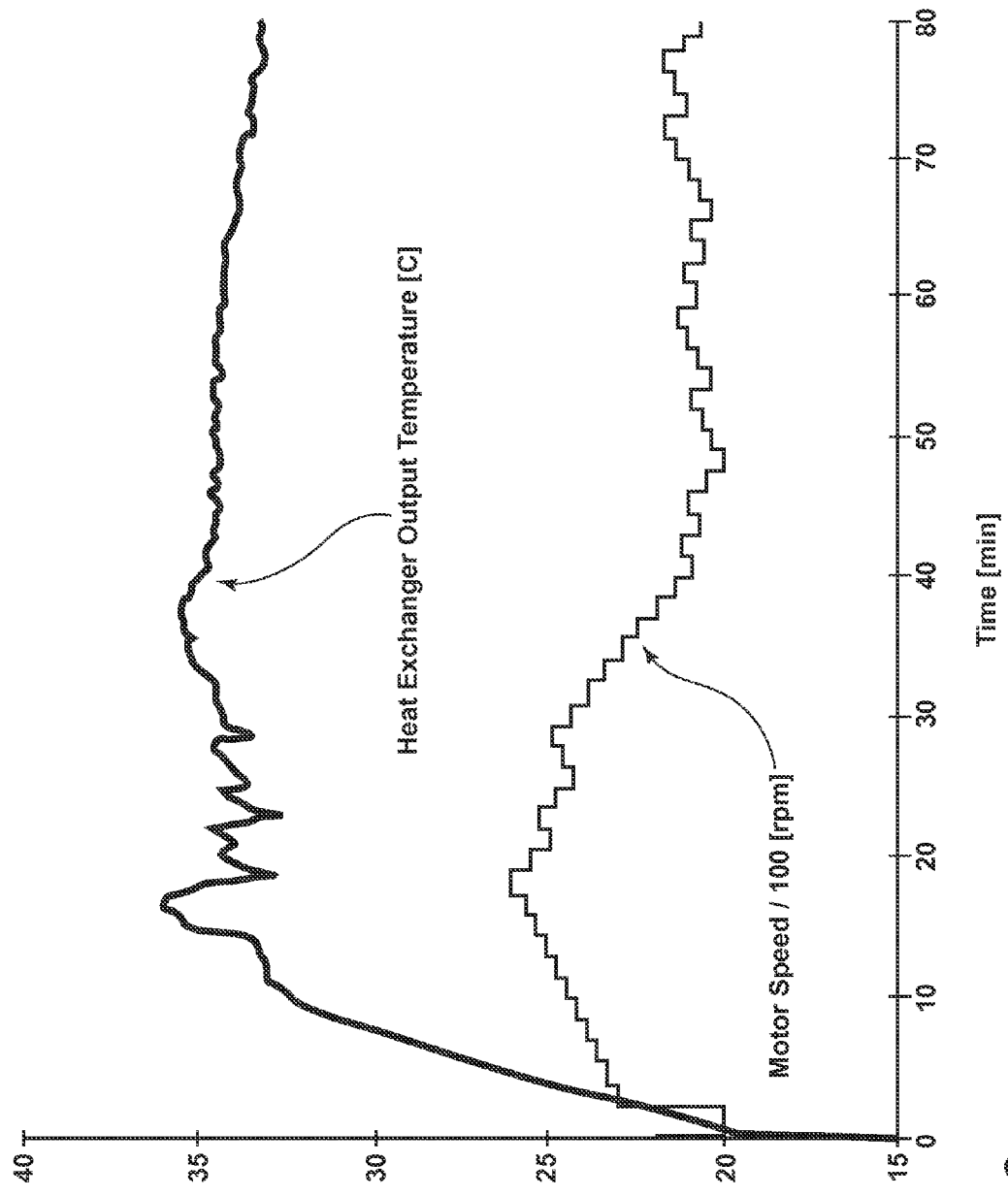

Other experimental data of the above control strategy are shown in FIGS. 5 and 6.

This experiment was carried out using a Whirlpool A Class dryer, equipped with a variable speed motor (BPM) and two heater coils (1500 W+1500 W).

FIG. 5 shows values of temperature in different places of the tumble dryer and values of the moisture ratio Mr for an experiment with a load of 3 kg and a set-point temperature of 63° C. FIG. 6 shows a motor speed and temperature of the air flowing out of the heat exchanger 20 for an experiment with the same load and a set-point temperature as for FIG. 5.

With a control method according to the invention the energy saving is optimized on the different quantity of load, maximizing the benefits with small quantity of load.

We claim:

1. A method for controlling operation of a clothes dryer comprising a drying chamber and an air flow system having a variable speed blower for forcing air through the drying chamber, comprising: determining a water removal rate during operation of the clothes dryer; assessing a value based on the water removal rate; and adjusting a speed of the blower depending on said assessed value.

2. The method according to claim 1, wherein the assessed value is based on a ratio ($\phi$) between the water removal rate and a power of a heater used to heat up an air flow upstream of the drying chamber.

3. The method according to claim 2, wherein the speed of the blower is changed depending on whether a previous change of speed in a previous control period has yielded an increase or decrease of the ratio ($\phi$), and, in case of increase, the change of speed being in a same direction, or, in case of decrease, the change of speed being in an opposite direction.

4. The method according to claim 1, for a clothes dryer having a heat exchanger for cooling air downstream from the drying chamber and upstream of a heater, wherein a difference of temperature of cooling air across the heat exchanger is measured, such difference being related to the water removal rate.

5. A household tumble dryer, comprising: a rotatable drum defining a drying chamber; an air flow system having a variable speed blower adapted to force air through the drum; and a control unit configured to determine a water removal rate during operation of the dryer, assess a value based on the water removal rate and adjust a speed of the blower depending on the assessed value.

6. The household tumble dryer according to claim 5, wherein the control unit is adapted to adjust the speed of the blower depending on a ratio between the water removal rate and a power delivered by a heater which is located upstream of the drum.

7. The household tumble dryer according to claim 5, including a heat exchanger downstream from the drum for condensing water in an air flow, wherein the value is assessed by measuring a temperature increase of a cooling air across the heat exchanger.

8. The household tumble dryer according to claim 5, wherein the control unit is adapted to process a signal from a weight sensor detecting an amount of condensed water.

9. A method for controlling operation of a clothes dryer including a drying chamber and an air flow system having a variable speed blower for forcing air through the drying chamber, the method comprising:
    calculating a water condensing rate during operation of the clothes dryer;
    calculating a performance index using the water condensing rate; and
    adjusting a speed of the variable speed blower based on the performance index.

10. The method of claim 9, wherein calculating the performance index includes calculating a performance index using the water condensing rate and a power applied to a heater used to heat an air flow upstream from the drying chamber.

11. The method of claim 10, wherein calculating the performance index includes calculating a ratio ($\phi$) of the water condensing rate and the power applied to the heater used to heat the air flow upstream from the drying chamber.

12. The method of claim 9, wherein adjusting the speed of the variable speed blower includes:
    determining whether a previous change of speed of the variable speed blower in a previous control period yielded an increase or a decrease in the performance index; and
    changing the speed of the variable speed blower in a same direction as the previous change of speed if the performance index increased or changing the speed of the variable speed blower in an opposite direction of the previous change of speed if the performance index decreased.

13. The method of claim 9, wherein the clothes dryer further includes a heat exchanger for cooling air downstream from the drying chamber and upstream from a heater, and wherein calculating the water condensing rate includes measuring a temperature difference of cooling air across the heat exchanger.

14. The method of claim 9, wherein the clothes dryer further includes a weight sensor configured to detect an amount of condensed water in a water tank, and wherein calculating the water condensing rate includes measuring the amount of condensed water in the water tank.

15. The household tumble dryer according to claim 5, wherein the value based on the water removal rate is a performance index calculated using a water condensing rate.

16. The household tumble dryer according to claim 15, wherein the performance index is a ratio ($\phi$) of the water condensing rate and a power delivered by a heater located upstream from the drying chamber.

* * * * *